Figure 1:
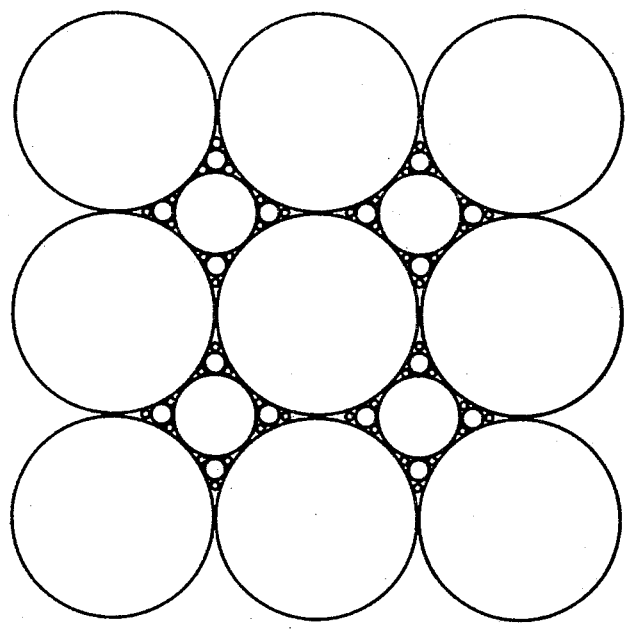

May 16, 1967 F. X. MAYER ET AL 3,320,050
FLUID BED PROCESS

Filed Dec. 16, 1963 3 Sheets-Sheet 1

MAXIMUM DENSITY AGGREGATE

Fig. I

FRANCIS XAVIER MAYER
DARRYL S. ROBERTS    Inventors

By Perry Carwellas

Patent Attorney

FRANCIS XAVIER MAYER
DARRYL S. ROBERTS

United States Patent Office 3,320,050
Patented May 16, 1967

3,320,050
FLUID BED PROCESS
Francis Xavier Mayer, Baton Rouge, La., and Darryl S. Roberts, Lawrence, Kans., assignors to Esso Research and Engineering Company, a corporation of Delaware
Filed Dec. 16, 1963, Ser. No. 330,769
7 Claims. (Cl. 75—26)

This invention relates to a method of improving fluid bed operations. This invention relates to a method of controlling particle size distribution in the fluid bed reaction zone whereby defluidization of the bed is prevented. Specifically, this invention relates to a process of improving direct reduction of iron ore in a fluid bed, and preventing bogging and defluidization of the bed. More specifically, the present invention relates to a method of preventing bogging and defluidization of a fluid bed of partially reduced iron ore particles which consists of adding large particles, of about uniform size, which particles are substantially larger than the largest size particle normally treated in the fluid bed reduction of iron ore. The addition of the large particles effectively disrupts the particle size distribution of the particles in the bed so as to prevent the formation of a maximum density aggregate particle size distribution.

It is known to contact beds of solid particles with gases to form fluid beds of particles and to carry out reactions of the gases and/or reactions of the solid particles with the gases. Heretofore, fluid solids-gas contacting processes have been carried out on a commercial scale with particles having approximately the same size and where substantially no change in particle size took place during the process; e.g., fluid bed catalytic cracking. Under these conditions, fluid beds can be maintained. Recently, however, particles having a wide size particle distribution have been contacted with gases in fluid bed reaction zones. A substantial amount of difficulty has been involved in maintaining efficient fluid bed operations in beds containing wide particle size distribution. The beds tended to bog and to defluidize thereby preventing carrying out the desired reaction.

Recently, it has been found that contact of a fluidized bed of iron ore with a suitable reducing gas will result in direction reduction of iron ore to metallic iron. An iron ore feed to be fluidized can be suitably prepared by grinding and screening the ore or by like methods, to obtain a particle size distribution favorable to fluidization. During the reduction of iron ore to metallic iron and particularly in the reduction of FeO to Fe, the iron particles undergo changes in size and shape resulting in a net decrease in particle size due to decrepitation of the small and intermediate size particles to make fines. Generally sticking or agglomeration of the ore particles are affected primarily by the composition of the ore, the fluidizing gas velocity, the degree of metallization, and the temperature of the bed. Usually, the higher the iron metallization; i.e., the greater the degree of reduction, the greater the tendency of the ore to stick or agglomerate at a given set of conditions of gas velocity and bed temperature.

In fluid bed iron ore reduction, bogging and defluidization of the ferrous reducing zone were a persistent operating problem. The amount of fines in a bed rapidly increases due to decrepitation and when the fines concentration became excessive; e.g., 40 to 50 wt. percent, the beds bogged. It was found, however, that this problem could be minimized by withdrawing fines from the fluid bed and controlling the fines concentration in the fluid bed (i.e., particles of minus 325 mesh) at about 8–20 wt. percent. Even though this procedure is satisfactory, from an operational viewpoint, it has a disadvantage in that the fines withdrawn generally have a lower degree of metallization and must either be eventually recycled or separately treated to bring them up to the same degree of metallization as the product that is withdrawn. It would, therefore, be desirable to find another means to obtain efficient fluid bed operation other than controlling the fines concentration of the bed between 8–20 wt. percent.

There are several variables which affect bogging of the fluidized particles. The velocity of fluidizing gas and the temperature of the fluidized bed are important factors to be taken into consideration. Another important factor affecting bogging is particle size distribution. A particular particle size distribution can bog at low gas velocity yet may maintain a fluid bed at a higher gas velocity. Under similar conditions of operations; i.e., the constant fluidizing gas velocity and bed temperature applicants found that the tendency of the bed to bog increases as the particle size of the bed undergoing fluidization approaches a theoretical maximum density aggregate particle size distribution.

The effect of particle size distribution can be explained by FIGURE 1 of the drawings. In the idealized illustrated situation it can be seen that a wide range of particle sizes are needed to fill the void spaces between the larger particles with smaller particles. It is apparent from the figure that the number of points of contact between particles increases as the range of particle size distribution increases. Applicants found that bogging occurs in fluid bed operations when the particle size distribution of the bed is wide and the number of points of contact between particles is large and a theoretical maximum aggregate particle size distribution is approached.

Figure 2:
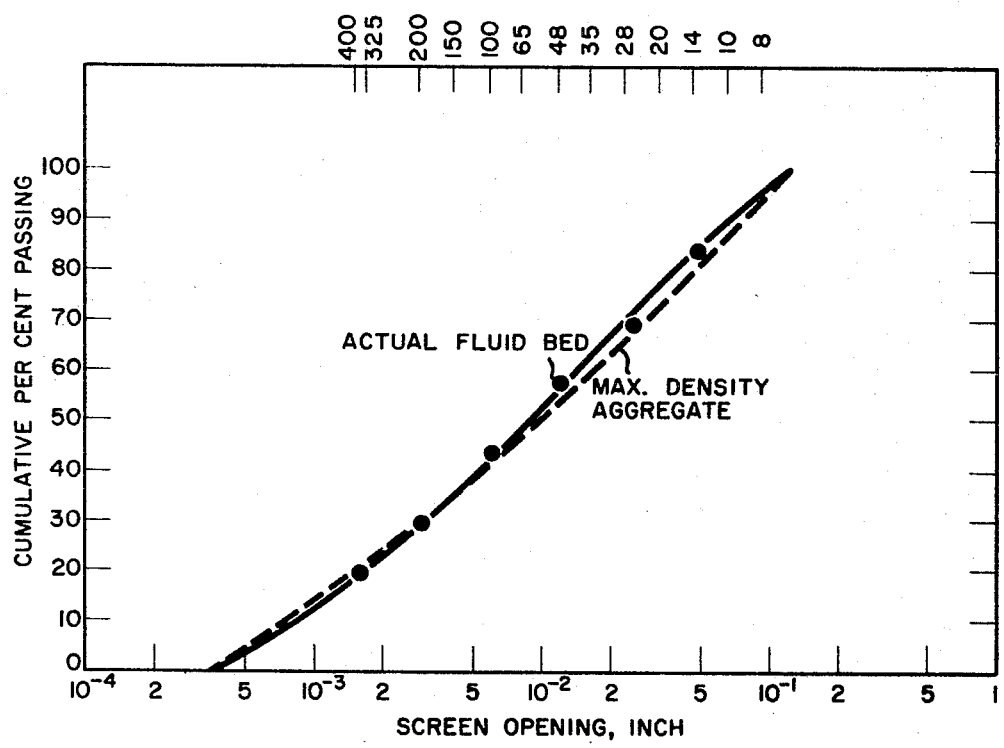

The comparison of a theoretical particle size distribution for a bed of minimum voids; i.e., maximum density aggregate and the actual size distribution for a fluid bed which has bogged is shown in FIGURE 2. It can be seen from the figure of the drawing, that the theoretical size distribution and actual size distribution of the bogged bed are very close.

Therefore, it is seen that one of the principal causes of bogging is the approach of the particle size distribution of the particles undergoing fluidization to the maximum density aggregate particle size distribution. Also, in the direct reduction of iron ore where the iron ore particles are in a high state of metallization, bogging and defluidization of the bed is caused by the presence of an excessive amount of fines; e.g., 20 to 50 wt. percent in the bed.

Normal preparation of a suitable ore for iron ore reduction requires grinding or milling the ore to obtain a particle size distribution of the ore of 4 mesh to about 10 microns in size and the average particle size is 35 to 65 mesh. While undergoing fluidization and reduction, particles of this wide range particle size will undergo decrepitation to make smaller particles whereby the particle size distribution will approach that of the maximum density aggregate and the fluid bed would then bog and defluidize.

Applicants have found that the particle size distribution when bogging occurs is approximately that of the maximum density aggregate, and also found that in the ferrous reduction zone where there is an excess of fine particles above that of the maximum density aggregate that bogging occurs.

In accordance with the present invention applicants have unexpectedly found that bogging could be prevented and defluidization of the bed prevented by controlling the particle size distribution of the material undergoing reduction in the fluid bed, by the addition of large particles of about uniform size which particles effectively disrupted a maximum density aggregate of the solids in bed. Applicants also found that by adding the large uniform size particles to the bed, that it was not necessary to maintain the fines concentration in the bed between about 8 to 20 wt. percent in order to prevent sticking and agglomeration of the fines and bogging of the bed. In accordance with applicants' invention, fines content can be as high at 40 to 50 wt. percent without bogging occurring.

Maintaining fluid bed operation by controlling fines in the bed, as above stated, is difficult. In accordance with applicants' process, fluid bed operation can be maintained and the maximum density aggregate of the particle size avoided and bogging of the bed prevented by the addition to the fluid bed of a substantial amount of coarse particles of about uniform size which particles are at least twice as large as the largest size particle of the wide particle size distribution of the solids undergoing fluidization. Addition of the large particles disrupts the particle size distribution in the bed from the maximum density aggregate and prevents bogging. Addition of these large particles also prevents bogging due to excessive concentration of fines present because these large particles, in freely moving through the bed, tend to break up any large agglomerates of fines which may form due to the sticking together of the highly metallized fines in the fluid bed.

It has been found that the reduction to metallic iron of the large coarse particles added to disrupt the maximum density aggregate distribution in the bed is satisfactory. Also the decrepitation of these large particles is relatively insignificant in creating particles of intermediate size between the large coarse particles and the largest size particle of the particles undergoing fluidization during the period of time required to carry out the reduction of the large particles and the reduction of the particles being treated. Further, additional large particles to maintain the disruption of the particle size distribution from the maximum density aggregate distribution can be added during the reduction reaction to maintain efficient fluidization of the bed.

Applicants have found an efficient, economical method of controlling a fluid bed operation whereby bogging and defluidization of the bed is prevented by adding to the fluid bed a sufficient amount of uniform size particles substantially larger in size than the largest particle already in the bed. The addition of the larger particles prevents the particle size distribution of the particles being fluidized from approximating the distribution of a maximum density aggregate. The concentration of uniform size larger particles that are required within a particular fluidized bed reaction zone to prevent the formation of the particle size distribution of a maximum density aggregate can be determined by removing a portion of the solids and screening to determine the particle size distribution.

Figure 3:
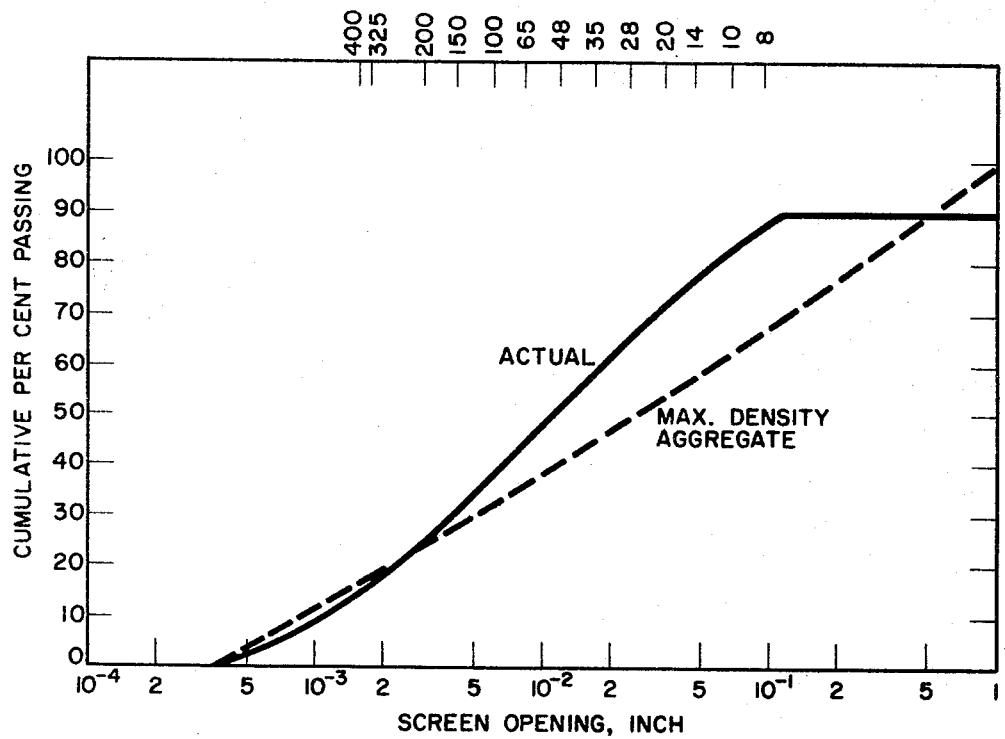

In the drawings:

FIGURE 1 depicts the size distribution of spherical particles in a solids system of a given size range capable of forming an aggregate having maximum theoretical density;

FIGURE 2 shows the particle size distribution of a system or iron ore particles which is susceptible to bogging compared to the theoretical size distribution of particles in a maximum density aggregate of the same size range; and FIGURE 3 illustrates the effect on particle size distribution of adding large particles, in accordance with this invention, to a system of iron ore particles which is susceptible to bogging.

Specifically, FIGURE 1 of the drawings is an illustration of a situation where a wide range of particle sizes result in forming a maximum density aggregate particle size distribution. From this drawing it can be seen that the number of points of contact between the particles is large providing sufficient contact area to cause bogging. If 5 to 20 wt. percent of particles having 2 or 3 times the diameter of the largest particle shown in the particle size distribution are added, it can readily be seen that the particles of this size would disrupt the maximum density aggregate particle size distribution and prevent agglomeration and bogging of the solids in the fluid bed.

FIGURE 2 of the drawings illustrates a comparison of the theoretical size distribution for a bed of maximum density aggregate particle distribution, which is the dotted line, and a particle size distribution of solids in a fluid bed of iron ore particles which actually bog under operational conditions, which is the continuous line. It can be seen from this drawing that the theoretical size distribution and the actual size distribution are very close. As the range of the particle size distribution increases, the number of points of contact between the particles also increases. Where the size distribution of the fluid bed is wide, the number of points of contact is large and the chance of bogging occurring is increased.

FIGURE 3 of the drawing is an illustration of a particle size distribution, the same as that illustrated in FIGURE 2, with the exception that 10 wt. percent of iron ore particles 1" in diameter of uniform size were added to the fluid bed. The particle size distribution of the aggregate containing the 10% of 1" spheres is shown by the continuous line. It can be seen by comparing the maximum density aggregate, which is the dotted line, distribution curve with the curve of the particle containing 10% of 1" spheres that the solids containing the 10% 1" spheres have a particle size distribution curve which is substantially different from that of the maximum density aggregate curve and this particle size distribution of solids does not bog on being fluidized.

The fluidizing gases utilized in accordance with the present invention can comprise the reducing gases, can be inert gases added to increase or decrease the viscosity or density of the fluidizing gas or can be the reducing gases alone. For example, nitrogen can be added to a reducing gas for the reduction of metallic oxides to metal to increase the density and viscosity of the fluidizing gas and to dilute a particular reducing gas. In iron ore reduction, hydrogen or carbon monoxide can be used alone or hydrogen can be mixed with carbon monoxide and used as the reducing gas. Also, in reducing iron ore normally gaseous hydrocarbons or normally liquid hydrocarbons can be partially oxidized in the presence of an oxygen-containing gas and the combustion products can be used to provide heat for the reduction as sensible heat of the combustion gases. The reducing gas can also provide the primary fluidizing gas for the fluid bed. Solids which can be reacted with gases or fluidized by gases can be any solids which can be fluidized by contacting the solids with the fluidizing gas. The solids will be generally of a wide size particle distribution. The invention is particularly related to the reduction of metal oxides to metals in a direct reduction fluid bed reaction zone. In iron ore reduction, intermediate and small size particles decrepitate to form smaller size particles. After fluidizing for period of time the iron ore particles undergoing reduction approach the particle size distribution of the maximum density aggregate. The initial ore feed to the reduction reaction will be between about 4 mesh and 10 microns. Preferably the solids are minus 4 mesh with 80 wt. percent of the solids being between 4 mesh and 325 mesh. Particles of iron ore that would be added to prevent the formation of a maximum density aggregate can be particles of about uniform size having a diameter of about ¼" to 2" and preferably about ½ to 1 inch. These particles will be at least twice as large as the largest particles undergoing treatment in the fluid bed reaction zone.

In accordance with the present invention the diameter of the fluidized beds can be 2 to 30 feet in diameter and preferably 10 to 20 feet in diameter and the height of the fluid bed can be about 5 to 50 feet. To carry out the reduction of iron ore, the reducing temperatures will be in the range of 1200 to 1600° F. and the pressures can be from subatmospheric but generally pressures in the range of 5 to 100 p.s.i.g. are more common. The superficial gas velocity used to fluidize the beds can be within the range of 1 to 5 ft./sec. and more generally in the range of 2 to 4 ft./sec. The fluid bed containing particles in the range between about 4 mesh to about 10 microns. The average mean particle size of the solids before adding the large particles will be in the range of about 35 to 65 mesh. Uniform size coarse or large particles which are added to this wide particle size distribution to disrupt the particle size distribution and prevent the formation of a particle size distribution approximating that of a maximum density aggregate would be in the range of 2 to 10 times the diameter of the largest particle from the ground ore feed to the fluid bed to which the large particles are to be added. More generally, the uniform size particles will be about 2 to 5 times the diameter of the largest particle in the ground feed particle size distribution of the ore being treated. These uniform size large particles are added to disrupt the particle size distribution and to prevent the approach of the solids of a theoretical maximum density aggregate particle size distribution and will be used in an amount of 5 to 30 wt. percent based on total weight of solids to which it is added.

The uniform size large particles are made by grinding a portion of the ore separately to obtain particles, for example, about ¼ to 2" in diameter, preferably about 1 inch in diameter, by screening the ground material to remove smaller particles and larger particles and obtaining a stream of iron ore particles of about uniform size. These particles will be added to the fluid iron ore reduction bed in a sufficient quantity to maintain a disrupted particle size distribution.

The amount of large particles needed can be determined by periodically removing a sample of the solids from the fluid bed and screening the sample to determine particle size distribution. A sufficient amount of large particles are added as needed to prevent the formation of a maximum density aggregate particle size distribution.

Further, by using applicants' process it is found that the concentration of fines in the bed of up to 30 to 40 wt. percent, i.e., of solids of minus 325 mesh, can be tolerated in the bed without bogging and defluidization of the bed. It appears that the movement of the large particles tend to break up any agglomerates of fines which form. Heretofore, it had not been possible to operate a fluid bed wherein a concentration of fine materials of greater than about 20 wt. percent without bogging occurring.

The invention may be better understood by the following examples:

EXAMPLE I

The most critical stage in the iron ore reduction process where bogging is most likely to occur is in the reduction of FeO to Fe, therefore, the examples will be directed to this stage of the iron ore reduction. The reducing gas consisting essentially of 40 vol. percent of $N_2$, 60 vol. percent of hydrogen is directly contacted with the partially reduced iron ore consisting essentially of FeO and Fe. The reduction is carried out at a temperature of about 1200° F. and at a pressure of about 40 p.s.i.g. The feed to the reducing operation is ground by suitable means and after reduction from $Fe_2O_3$ to FeO the FeO and Fe are recovered and found to have a particle size distribution as shown below in Table I.

Table I

| Cumulative wt. percent passing— | Mesh |
| --- | --- |
| 100 | 4 |
| 97 | 8 |
| 83 | 14 |
| 70 | 28 |
| 55 | 48 |
| 47 | 65 |
| 42 | 100 |
| 34 | 150 |
| 29 | 200 |
| 20 | 325 |
| 18 | 400 |

This particle size distribution is illustrated in FIGURE 2 of the drawings as the solid line on the graph.

The solids are separated into two equal portions. The first portion, as shown in the above table, has a particle size distribution of —4 mesh to about —325 mesh with about 20 wt. percent smaller than —325 mesh. The average particle size of the particles in the bed is about 48 to 65 mesh. These particles are fed into a vessel about 2.0 feet in diameter to form a fluid bed about 16 feet in height. The bed is maintained as a fluid bed by continuously feeding to the partially reduced ore in the bed reducing gas at a superficial linear gas velocity of about 3.25 ft./sec. After a few hours of operation, the bed becomes bogged and defluidized and the operation is stopped. The second portion of the above sample is taken and also put in a 2.0 ft. diameter vessel and filled to a level of 16' in height. The bed is fluidized by feeding reducing gas to the bed at a superficial linear gas velocity of 3.25 ft./sec. A sample of iron ore which has been ground and screened to obtain a uniform size ore of about 1" in diameter is fed to the bed until about 10 wt. percent of the solids in the bed comprise the 1" diameter ore. This bed is operated for a prolonged period without bogging. The particle size distribution of the solids in the bed after adding the 1" spheres is illustrated by the continuous curve in FIGURE 3 of the drawing.

By comparing this curve with the maximum density aggregate (the dotted line) it can easily be seen that the addition of the large particles disrupts the maximum density aggregate particle size distribution with the result that bogging is prevented.

EXAMPLE II

In this example the feed having the same particle size distribution as Example I is separated into two portions as in Example I except that the fines concentration was about 30 wt. percent; i.e., of particles of —325 mesh. The fluidizing gas in this case consists essentially of 40% hydrogen, 20% carbon monoxide and 40% nitrogen. This gas is directly contacted with FeO and Fe to reduce it to about 90% metallic iron. In this example, the contacting is carried out at a temperature of about 1390° F. The two samples are separately fluidized and the first sample bogged after a few hours of operation. To the second sample, prior to fluidizing it in the bed, 20 wt. percent of large particles of ½" in diameter made in the manner discussed above is added to the bed. This bed is fluidized at a temperature of 1390° F. and a superficial gas velocity of 3 to 4 ft./sec. The diameter of the fluid bed is 2.0 feet and the height is 14 to 16 feet. This bed is fluidized for a prolonged period of time and does not bog, and 90% metallic iron is recovered.

The technique of the present invention consists primarily of controlling the particle size distribution of the particles undergoing fluidization so that a maximum density aggregate particle size distribution is not allowed to form and to maintain within the fluid bed sufficient amount of large uniform size particles that are substantially larger than the largest particle in the bed being fluidized. By operating in this manner bogging and defluidization of the bed is prevented. This technique can be used in contacting any solids with any gases and has particular application to the reduction of iron ore where decrepitation, agglomeration, bogging and defluidization of the bed are a problem.

This technique has particular advantage where particles of wide size particle size distribution are being fluidized and the nature of the particles are such that they can under the conditions of fluidization become sticky and stick together.

The concentration of large uniform size particles which are added in accordance with the present invention and the technique for controlling the concentration of these particles is applicable to various metal oxide reduction processes, which metals can be reduced in a fluid bed reaction zone. Although iron ore has been specifically described as the metal oxide being reduced, the invention is also applicable to the reduction of other metal oxides, metal sulfides, etc. Obviously, many other modifications and variations of the invention as heretofore set forth may be made without departing from the spirit of the scope thereof. Therefore, only such limitations should be imposed as are indicated by the appended claims.

What is claimed is:

1. An improved method for preventing bogging in a fluid bed of finely divided particles which have a tendency to bog under normal fluid bed operating conditions and which have a particle size distribution similar to that of a maximum density aggregate of the same particle size range which comprises providing in said bed larger particles of generally uniform size at least about twice the size of the largest of said finely divided particles, the larger particles being provided in an amount ranging from about 5 to 30 wt. percent of the finely divided particles in the fluid bed, whereby the overall particle size distribution is made substantially different from that of a maximum density aggregate of the same particle size range.

2. The method of claim 1 wherein the size of said finely divided particles range less than about 4 mesh and said larger particles are within the size range from about ¼" to about 2".

3. The method of claim 7 wherein said larger particles are provided in an amount ranging from about 10 to about 20 wt. percent of the total iron ore in the fluid bed.

4. In an iron ore reduction process wherein ore particles are reduced in a fluidized bed, the improvement comprising employing a fluidized bed consisting essentially of (a) finely divided particles ranging less than about 4 mesh in size, and
(b) larger particles within the size range of about ¼" to 2", said larger particles being present in an amount ranging from about 5 to about 30 wt. percent of the finely divided particles.

5. The process of claim 4 wherein said finely divided particles contain from 20 to 50 wt. percent fines having a particle size less than about 325 mesh.

6. A method for improving the resistance to bogging of finely divided fluidizable iron ore solids ranging less than about 4 mesh in particle size which comprises adding to said solids generally uniform larger particles in the range from about ¼" to 2" in size, said larger particles being at least about twice the size of the largest of the finely divided solids.

7. A method for preventing agglomerating and bogging of finely divided, partially reduced iron ore particles ranging less than about 4 mesh in size in a fluid bed which comprises providing in said bed larger partices of generally uniform size within the range from about ½ inch to about 1 inch, the larger particles being provided in an amount ranging from about 5 to 30 wt. percent of the finely divided particles in the fluid bed, whereby the overall particle size distribution is made substantially different from that of a maximum density aggregate of the same particle size range.

References Cited by the Examiner

UNITED STATES PATENTS

| | | | |
|---|---|---|---|
| 2,758,021 | 8/1956 | Drapeau, et al. | 75—26 |
| 2,848,316 | 8/1958 | Davis, et al. | 75—26 |
| 2,870,002 | 1/1959 | Johnson | 75—9 |
| 2,876,091 | 3/1959 | Reed | 75—26 |
| 3,053,648 | 9/1962 | Stephens, et al. | 75—26 |
| 3,066,017 | 11/1962 | Jahnig | 23—1 |
| 3,079,248 | 2/1963 | Lewis | 75—26 |

BENJAMIN HENKIN, *Primary Examiner.*